United States Patent Office 3,367,884
Patented Feb. 6, 1968

3,367,884
PRODUCTION AND USE OF HYDROCARBON CONVERSION CATALYSTS COMPRISING ACID TREATED CRYSTALLINE ALUMINOSILICATES
Luther J. Reid, Jr., Audubon, N.J., assignor to Mobil Oil Corporation, a corporation of New York
No Drawing. Filed Dec. 30, 1965, Ser. No. 517,837
14 Claims. (Cl. 252—455)

This invention relates to new hydrocarbon conversion catalysts, including the production and the use thereof. In particular, this invention relates to aluminosilicate catalysts, which have controlled selectivity and activity for effecting conversion of hydrocarbons and to a method for producing such catalysts.

Heretofore, during initial investigations of the use of aluminosilicates as catalysts for the conversion of hydrocarbons, e.g. cracking and the like, new catalysts were discovered that have relative activities more than 10,000 times greater than the catalysts presently used for the cracking of hydrocarbons.

This level of superactivity has made the use of such catalysts practically impossible in present day commercial cracking equipment. For instance, some of the problems caused by the use of the superactive catalysts include rapid and uniform heating and/or cooling of catalyst beds, attainment of extremely high space velocities and the need for short operating cycles.

Therefore, rather than wait for the necessary advancement in technology it has been found that the superactive catalysts can be utilized by reducing their levels of activity to suit existing equipment and existing processes. Also, the lower levels of activity can be maintained well above that exhibited by known conversion catalysts. Advantageously, in accordance with this invention, a new method has been found for altering the superactive catalysts to produce catalysts having lower levels of controlled activity.

Thus, this invention contemplates a method for preparing new catalysts from certain superactive catalysts, e.g., ion exchanged, alkali metal aluminosilicates, by treating the superactive catalysts with a leaching solution to alter the ordered internal structure of the catalyst. This invention, further contemplates new aluminosilicate catalysts having a modified ordered internal structure which exhibit controlled activity and product selectivity for promoting the conversion of hydrocarbons by cracking, alkylation, isomerization, polymerization, and the like processes. This invention still further contemplates a process for effecting conversion of hydrocarbons, as described above, in the presence of the new catalysts under selected reaction conditions.

In accordance with this invention it has been found that leaching an ion exchanged, alkali metal aluminosilicate catalyst with acid or the like, produces a new catalyst having improved product selectivity along with sufficient catalytic activity for hydrocarbon conversions. As hereinafter described in greater detail, leaching the aluminosilicate causes a significant modification or rearrangement of its ordered internal structure. This modified ordered internal structure is believed to be the reason for the reduction of catalytic activity which accompanies the leaching treatment.

The superactive catalysts suitable for purposes of this invention include synthetic and naturally occurring aluminosilicates which contain metal cations and/or hydrogen ions ionically bonded or chemisorbed within an ordered internal structure. In general, the superactive aluminosilicates are prepared from the alkali metal and/or alkaline earth metal forms by base exchange with certain polyvalent metal cations or with certain polyvalent metal cations and hydrogen ions which partially replace the alkali and/or alkaline earth metal cations. After being base exchanged, the aluminosilicates are activated by being dried and calcined to form a crystalline product having a system of internal pores, passages or cavities within an ordered internal structure. The superactive level of catalytic activity produced by such treatment is, in part, determined by the cations employed as well as the extent of base exchange of the aluminosilicate. As hereinafter described in greater detail, such catalysts have been found to have an $\alpha$ value of about 10,000; where $\alpha$ is the relative activity of the catalyst based upon a conventional amorphous silica-alumina cracking catalyst having an activity $\alpha$ of 1.

In general, the new catalysts of this invention can be prepared from a variety of alkali and/or alkaline earth metal aluminosilicates that have been base exchanged with certain polyvalent metal cations or certain polyvalent metal cations and hydrogen ions, ammonium, or amine cations. However, because removal of alumina from the aluminosilicate material is effected by leaching with an acid or the like, the preferred exchanged aluminosilicates should be relatively acid stable.

Advantageously it has been found that aluminosilicates having a high silicon to aluminum atomic ratio are particularly desirable for purposes of this invention. As a rule, the ratio of silicon to aluminum atoms is at least about 1.8 to 1 in the preferred type of aluminosilicate catalyst. In addition, effective catalysts can also be prepared from certain polyvalent cationic forms of crystalline aluminosilicates having a lower silicon to aluminum atomic ratio. For example, the acid stability of many aluminosilicates is substantially enhanced by being base exchanged with certain polyvalent metal cations, particularly those having valences of three or more (such as those of the rare earth metals). Thus, the crystalline calcined trivalent cationic forms of aluminosilicates of lower silicon to aluminum atomic ratio are also particularly suitable for preparing the catalysts of this invention.

It will be appreciated that, as suggested by the preceding paragraph, this invention also encompasses a method for producing new catalysts from less active alkali metal aluminosilicates. Thus, it is apparent that an alkali or alkaline earth metal aluminosilicate can be base exchanged, dried, and calcined, as described above, and thereafter leached with an acid or like solution to produce the new catalysts contemplated by this invention.

It is believed that leaching the superactive aluminosilicate catalyst with an acid solution removes the alumina associated with the residual alkali metal that remains in the aluminosilicate after it has been base exchanged. Apparently, the leaching solution hydrolyzes the alumina, thereby removing it from the aluminosilicate. Within the spatial arrangement of $AlO_4$ and $SiO_4$ tetrahedra which make up the alkali metal aluminosilicate structure, there are numerous exchangeable cation sites; that is, positions where alkali metal cations are bonded to the alumina tetrahedron. Base exchange of these aluminosilicates with metal cations or hydrogen or ammonium ions partially replaces the alkali metal cations attached to alumina tetrahedra. In those instances when polyvalent metals are used, two or more neighboring cation sites are occupied by the valence electrons of the polyvalent metals. Apparently, as evidenced by an increase in thermal and acid stability of the aluminosilicate, the polyvalent metal cations are strongly bonded to the alumina tetrahedra. On the other hand, because only one alkali metal cation is attached to each alumina tetrahedron, it is believed the bond strength between the alkali metal cation and the alumina is relatively weak so that alumina can be hydrolyzed by the leaching solution. Also after calcination of the polyvalent cationic forms of the aluminosilicates, there is a rearrangement of cations whereby the residual alkali metal cations take up more exposed and more readily exchangeable positions in the structure.

Advantageously, it has been found that the modified ordered internal structure of the new catalysts resulting from the removal of the alumina from the ion exchanged, alkali metal aluminosilicate can be determined by X-ray diffraction techniques. Apparently, removal of the alumina from the aluminosilicate causes contraction of the unit cells in its crystalline structure. This contraction of unit cells is shown by comparing the X-ray diffraction pattern of a treated (leached) aluminosilicate catalyst with that of an untreated aluminosilicate catalyst; both catalysts being compared after a final calcination at 1300 F. in dry air. Thus, it has been found that leaching of the exchanged aluminosilicate with an acid induces an X-ray "shift," or change in the glancing angle $\theta$ of the X-rays which accompanies a shortening of the interplanar distances $d$ between the lattice planes of the unit cells. This relationship is defined by the Bragg Equation:

$$n\lambda = 2d (\sin \theta)$$

in which $\lambda$ is the wave length of the X-rays and $n$ is an integral number of wave lengths necessary for maximum reflection of the X-rays from the lattice planes within the aluminosilicate crystal.

It will be appreciated that the greater the shift or degree of contraction of the unit cells in the ordered internal structure of the aluminosilicate, the greater will be the reduction of catalytic activity of the aluminosilicate. Thus, the X-ray diffraction technique provides a simple test method for indicating the relative activity of a new catalyst prepared in accordance with this invention. In general an X-ray shift of from about 10% to about 100% shows that the activity of the new catalyst may be from about 50% to about one percent of that of the superactive catalyst.

As herein used, the "percent shift" is determined as follows:

A sample of aluminosilicate to be leached is calcined for 10 hours at 950° F. and an X-ray goniometer tracing made of the aluminosilicate powder diffraction pattern using CuK$\alpha$ radiation. The exact position of the X-ray diffraction line lying nearest the Bragg angle $2\theta$ of 57.5° is noted. Then the sample is leached with acid, washed, and calcined and a goniometer tracing is made in exactly the same way. When shift is present all the lines in the second tracing will be displaced from their positions on the first tracing. The exact position of the same line, i.e., the line corresponding to the one lying nearest to the Bragg angle $2\theta$ of 57.5° in the first tracing, is noted in the second goniometer tracing.

The "percent shift" is determined from the displacement of the line according to the following table:

| Increase in Bragg angle $2\theta$ at which line appears: | Percent shift |
|---|---|
| 0.2 | 25 |
| 0.4 | 50 |
| 0.8 | 100 |
| 1.2 | 150 |
| 1.6 | 200 |

For example, calcined rare earth exchanged zeolite X (with a Si/Al atomic ratio of 1.25) has an X-ray powder diffraction line at 57.5°. If after treatment with acid, washing, and calcination, the same line in a new diffraction pattern appears at 58.3°, then the percent shift is 100.

In another example, calcined rare earth exchanged zeolite Y (with a Si/Al atomic ratio of 2.5) has an X-ray diffraction line at 580°. If, after treatment a new diffraction pattern shows that this line is displaced to 59.2°, then the percent shift is 150.

Thus it is evident from the above, that shift increases when the same type of aluminosilicate is synthesized under conditions that lead to higher silica to alumina ratios within the crystal structure. Conversely, it is believed that when an aluminosilicate material is treated in such a way that the percent shift increases, alumina is being removed from the crystalline structure even though it is not removed entirely from the solid product. Thus chemical analysis does not distinguish between alumina present in the crystal structure and the amorphous or cationic alumina present in the leached product. Thus it has been necessary to correlate the results in terms of shift, rather than by chemical analysis. For high silica zeolites having silicon to aluminum (Si/Al) atomic ratios above 3 more severe leaching conditions can be used which will remove aluminum as soluble alumina. In these cases, it is believed that the catalytic activity may be correlated against the silica to alumina ratio.

In accordance with the process of this invention, the activity and improved product selectivity of the new catalysts for promoting hydrocarbon conversion reactions can be controlled by regulating the extent of ion exchange of the alkali or alkaline earth metal aluminosilicate, by calcining of the exchanged aluminosilicate to form a crystalline product, and thereafter by the leaching of the crystalline product to remove the alumina associated with its residual alkali or alkaline metal content.

Thus, the residual alkali and/or alkaline earth metal (cations) found in the ion exchanged aluminosilicates and, in part, the amount of alumina that may be removed by leaching, are controlled by the initial ion exchange of the aluminosilicate. In general, the alkali metal and/or alkaline earth metal aluminosilicates are ion exchanged so that residual alkali and/or alkaline earth metal content ranges from about 0.1 percent by weight to about 5.0 percent by weight of the calcined solid catalyst; preferably, the residual metal content is from about 1.0 percent by weight to about 3.0 percent by weight of the solid catalyst. It will be appreciated that the shift induced by leaching the aluminosilicate, as described above, is also controlled by the extent of ion exchange of the aluminosilicate; the greater the extent of ion exchange, the smaller the shift or possible reduction in catalysts activity for a specific leaching treatment.

After the alkali metal aluminosilicates have been base exchanged with a solution of polyvalent metal cations, the resulting wet cake is washed, dried and then calcined to produce an activated crystalline product at temperatures from about 400° F. to about 1500° F. and preferably from about 1000° F. to 1500° F. for a period of from about 1 hour to about 10 hours. The higher temperatures are required for the aluminosilicates having high silica to alumina ratios.

It will be appreciated that calcination removes the water of hydration from the crystal. It has been found that calcination of the exchanged aluminosilicate is essential for inducing the X-ray shift that occurs upon leaching of the aluminosilicates. Preferably, this calcination is carried out between about 650° F. and 1500° F. until the moisture content is below about 2 percent.

As described above, the alumina associated with the residual alkali metal in the ion exchanged aluminosilicates may be removed by treating the calcined aluminosilicate with an acid or the like. Any solution capable of leaching out the alumina associated with the alkali metal without substantially destroying the crystalline structure of the aluminosilicate may be used. Generally, the solutions are those which will hydrolyze alumina. Thus, acids, including both organic and inorganic e.g. acetic, hydrochloric and the like, can be used in dilute concentrations, i.e. from about 0.01 N to about 1 N.

In general, leaching of alumina is conducted at temperatures from about 0° F. to about 212° F.; temperatures below 80° F. being preferred.

After the aluminosilicate has been leached, it is washed with water and dried at a temperature of about 250° F.

for about 3 hours. It will be appreciated that severe leaching conditions remove a greater proportion of the alumina associated with the alkali metal from the aluminosilicate, so that the catalyst resulting from such treatment exhibits a corresponding lower activity. Thus, the severity of leaching is dependent upon the desired level of catalytic activity required for a specific application of the catalysts of this invention.

Because the unique activity of the aluminosilicate catalyst for effecting the conversion reactions of the present invention is also dependent on the availability of active cation sites therein, as well as the nature of these sites, the defined pore size of the aluminosilicate is to be considered during its preparation. In general, the aluminosilicate should have a pore size of such dimensions that it can accept the reactants of this invention within its ordered internal structure and allow egress of the products. Thus, the pore size is from at least about 4 A. and preferably about 4 A. to about 15 A. in diameter. It will be appreciated that the selection of the aluminosilicate catalyst, to be used in a specific application, will depend upon the reactants and also the reaction products.

Typical of the aluminosilicates employed in accordance with this invention, are several aluminosilicates, both natural and synthetic, which have a defined pore size of from about 4 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

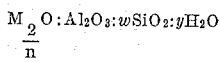

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials are the presence in their molecular structure of about one equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic faujasite designated as zeolite X, and is represented in terms of mole ratios of oxides as follows:

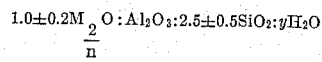

wherein M is a cation having a valence of not more than 3, $n$ represents the valence of M and $y$ is a value up to 8, depending on the identity of M and the degree of hydration of the crystal. The sodium form may be represented in terms of mole ratios of oxides as follows:

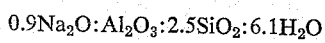

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

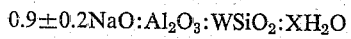

wherein W is a value greater than 3 up to about 6 and X may be a value up to about 9.

The selectivity of zeolite Y for larger molecules is appreciably the same as zeolite X because its pore size extends from 10 A. to 13 A.

Other aluminosilicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

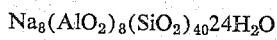

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g. acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other aluminosilicates can be employed to produce the catalysts of this invention. The aluminosilicate advantageously should have ordered internal structure capable of chemisorbing or ionically bonding additional metals, cations and/or hydrogen ions within its pore structure so that its catalytic activity may be altered for a particular reaction. Among the naturally occurring crystalline alumino-silicates which can be employed are faujasite, heulandite, clinoptilolite, chabazite, gmelinite, erionite, mordenite and mordenite-like structures, dachiardite, and stilbite.

One of the effective new aluminosilicate catalysts is prepared from the sodium form of zeolite X having a pore size of about 13 A. This aluminosilicate is a commercially available zeolite designated as Linde "13X." The catalyst is prepared from the 13X zeolite by conventional base exchange involving partial replacement of the sodium of zeolite X by contact with a fluid medium containing cations of one or more of the rare earth metals. Any medium which will effect ionization without affecting the crystalline structure of the zeolite can be employed. After such treatment, the resulting exchanged zeolite product is water washed, dried and dehydrated. The dehydration thereby produces the characteristic system of open pores, passages, or cavities of the crystalline aluminosilicates.

As a result of the above treatment, the rare earth exchanged aluminosilicate is an activated crystalline catalyst material in which the molecular structure has been changed by having rare earth cations bonded thereto.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Thus, it has been found that the rare earth exchanged zeolite X catalyst can have from about 20 to about 30 percent by weight of the rare earth (RE) metals (calculated as $RE_2O_3$) with a sodium content of from about 0.1 to about 5 percent by weight.

The rare earth exchanged 13X catalyst has been found to have a comparative activity $\alpha$ of about 10,000, which can be reduced by leaching with an acid solution to an $\alpha$ value of from about 0.01 to about 9000, depending on the extent of leaching.

Other effective catalysts can be prepared from aluminosilicates such as zeolite Y and mordenite. Advantageously, exchange of rare earth metals for the sodium cations within zeolite Y followed by leaching the calcined product with an acid produces a highly active catalyst in a manner similar to that described for preparation of the leached rare earth exchanged zeolite X. In addition, because of its high acid stability, zeolite Y may be base exchanged by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

Mordenite can be activated to produce a highly active catalyst for preparing the catalysts of the instant invention by replacement of the sodium cations and/or its other exchangeable cations with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated, dried, calcined, and then leached with an acid solution.

It will be appreciated that cations of metals other than the rare earths having polyvalences can be employed to replace the exchangeable cations from the aluminosilicates to provide effective catalysts for this invention. Exemplary of these metals are chromium, iron, thorium and manganese. These metals are used with aluminosilicates having a relative high silica content such as zeolite Y and mordenite.

In order to evaluate the superactive catalysts, a new test capable of operation upon small quantities of charge and catalyst, under a precision of control well beyond the capability of the standard evaluation test, known as the "Microreactor" test, and capable of tracing the course of reaction in successive time intervals and at precise temperature levels was developed. This test is somewhat of a "micro method." The catalyst under investigation is placed in a refractory tube (Vycor, a commercial high silica glass is suitable) of about 8 millimeter outside diameter and is retained therein as a compact body by suitable porous plugs, such as of glass wool. This reactor tube is mounted in an electrically heated furnace. A suitable furnace would be one of about 1 inch internal diameter. With about 3 cubic centimeters of catalytic material, the furnace would be about 6 inches long, and a reactor tube of about 12 inches length would be suitable. A thermocouple is inserted in the annular space surrounding the reactor, and the ends of the furnace are plugged with glass wool. It will be recognized that the physical dimensions of this equipment are such that very close control of reaction temperature can be had.

At either end of the reactor tube a three-way valve is provided. To introduce reactant, an inert gas, such as helium, is bubbled through a body of liquid reactant to carry reactant into the reactor. The three-way inlet valve permits flushing before and after reaction, if desired, and also permits introducing of regenerative gases, if desired, after a reaction is investigated. The three-way valve upon the outlet permits passing all of the effluent to a collection zone, or permits diverting the effluent during a specified time interval, or at a specified temperature, to sampling and analysis. Chromatographic analysis of such samples permits a very rapid and close check upon the results of conversion with respect to many variables. The amount of reactant carried in with the inert gas is controlled by the partial pressure of the reactant at the temperature of the reactant supply vessel and by the flow rate of the gaseous carrier and arrangements may be made to control the temperature of the reactant supply.

In the further investigation of some of the superactive catalysts, the reactant selected was hexane; the helium gas rate was usually selected as 20 cubic centimeters per minute; the temperature of helium and of hexane, room temperature; and at atmospheric pressure.

When so examined, the catalysts were found to have very surprising levels of activity, far, far beyond any previously thought possible for conversions of the kind contemplated.

For example, when a catalyst, i.e., rare earth exchanged faujasite, was so tested with hexane at an LHSV of 0.33 at a partial pressure of about 0.25, at a temperature of 600° F., after a period of five minutes, about 85 percent of the hexane was being converted. In contrast, over an amorphous silica-alumina catalyst of conventional type and an activity index of about 46 (Cat A) no conversion of hexane can be detected until temperatures of the order of 930° F. are reached.

An examination of the reaction rate and of the temperature relations involved leads to the conclusion that the reaction velocity constant over the rare earth exchanged faujasite is of the order of about 10,000 times as great as that over conventional amorphous silica-alumina catalysts.

To properly appreciate the capabilities of these catalytic materials, there may be devised a scale of comparative activities, utilizing for the purpose:

$\alpha$=comparative activity based upon conventional amorphous silica-alumina cracking catalyst as $\alpha=1$.

Such a scale would be about as follows:

Table I

Conventional SiAl beads:
    Equilibrium catalyst from TCC ----- $\alpha \approx 0.5$
Conventional SiAl beads:
    Untempered, fresh ---------------- $\alpha \approx 1.5$ to 2.0
Silica Magnesia:
    (About same for same condition as SiAl.) ------------------------------- $\alpha \approx 0.5$ to 2.0
Alumina base-reforming catalyst ------- $\alpha \approx 0.1$ or less
Sodium faujasite --------------------- $\alpha \approx 0.5$ to 1.0
Fresh rare earth exchanged faujasite ----- $\alpha \approx 10,000$
Acid mordenite ---------------------- $\alpha \approx 10,000$ The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic activity or an activity attributable to close association or reaction with the crystalline aluminosilicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may be prepared by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

Advantageously it has been found that in many cases leaching may be carried out either before or after the aluminosilicate is combined with the matrix binder material.

The catalyst of aluminosilicate employed in the process of this invention may be used in the form of small fragments of a size best suited for operation under the specific conditions existing. Thus, the catalyst may be in the form of a finely divided powder or may be in the form of pellets of about 1/16" to about 1/8" in diameter, obtained upon pelleting the aluminosilicate with a suitable binder such as clay. The zeolite X, described hereinabove, may be obtained on a clay-free basis or in the form of pellets in which clay is present as a binder.

As will be evident from the examples hereafter set forth the treatment of the superactive aluminosilicate catalyst of the type described herein with a leaching solution affords substantial improvement in the product selectivity and activity for conversion of hydrocarbons when compared with that achieved with the superactive aluminocatalyst.

The reactions promoted by using the leached superactive crystalline aluminosilicate catalyst described herein involve conversion of certain types of organic compounds including cracking of paraffinic, olefinic, aromatic and naphthenic hydrocarbons, as well as mixtures thereof, e.g. petroleum fractions such as those boiling in a gas oil range; isomerization and polymerization of olefins; and alkylations and dealkylation of aromatic hydrocarbons.

Cracking of gas oil to make gasoline is an especially advantageous use of this invention. The catalyst either alone or bound in a matrix is contacted with gas oil at LHSV of about 4 to 2000 and at temperatures ranging from 250° F. to 1500° F. Such catalysts made from leached aluminosilicates generally give higher yield of gasoline and lower yield of coke and dry gas than catalysts made with untreated aluminosilicates. The gas oil cracking characteristics for a caalyst is determined in the "Cat-D" test.

The "Cat-D" test is carried out as follows: 100 cc. of 4 to 8 mesh catalyst is charged to a reactor held at 875° F. Fifty ml. of virgin gas oil having a boiling range of 450° F. to 950° F. is passed over the catalyst bed at a rate of 5 cc. per minute. Products are collected and analyzed. Coke is burned off the catalyst after the run and the amount determined by measuring the $CO_2$ formed.

Cracking of hydrocarbons, particularly normal hydrocarbons having a carbon chain of from about 5 to about 30 carbon atoms represents an especially advantageous use of the acid leached catalyst of this invention. The catalyst in such processes may be used in fixed bed operation or they may be used as a moving bed operation or in a fluidized operation. The general operating conditions cover a wide range because of the wide range of activities of the catalyst. In cracking paraffins for the production of olefins, the temperatures at which the reactions may be conducted can vary in a wide range as low as 900° F. to about 1600° F. Preferably the reactions are conducted at from about 1000° F. to 1400° F.

The cracking of normal hydrocarbons in accordance with the present invention can be conducted from subatmospheric to superatmospheric pressures. In some instances pressures of several hundred atmospheres may be used. Often, the pressure is atmospheric.

The amount of catalyst used will vary and depend on whether the process is used in a batch type of operation, a continuous, or a semicontinuous operation. Generally, in continuous and semicontinuous operations in which one or more reactor vessels are employed, with the cyclic regeneration of the catalyst, the amount of catalyst used, as measured in terms of the hourly space velocities of the charge, may range from about one to 1000; preferably from about four to about 50.

It will be understood that the aluminosilicate catalyst can be regenerated by burning off the contaminants at a temperature of about 900° F.

In general, the normal paraffins that may be employed as a charge in the process of this invention range from about $C_5$ to $C_{30}$ paraffins and mixtures thereof. Usually the conversion of the charge improves with increasing molecular weight; thus in cracking of hexane for example, low space velocities and high temperatures are desirable for satisfactory conversion. Cracking of other hydrocarbons including aromatics, naphthenes, and olefins is likewise carried out with the described catalysts.

In the examples that follow, continuous conversion reactions are carried out in a Vycor reactor having a thermowell extending into a catalyst bed containing about 3.0 cc. of catalyst. The reactor is wrapped with resistance wire and insulated with asbestos tape and aluminum foil for providing the heat into the catalyst. A variable transformer is used to regulate the heat input and an ice-cooled receiver and an air-cooled receiver form a condensing receiver attached to the bottom of the reactor.

After the catalyst is raised to reaction temperature, the hydrocarbon charge is continually passed over the catalyst for extended periods of operation.

Samples of the product are periodically condensed, removed, and analyzed by vapor phase chromatography, infra-red techniques, spectrometry or by fractionation.

The following examples will serve to illustrate the method of producing the new catalysts of this invention as well as their use for the conversion of hydrocarbons without limiting the scope of the present invention:

EXAMPLE I

Freshly prepared sodium faujasite is ion exchanged with a rare earth salt solution to produce a rare earth exchanged faujasite having a residual sodium content of 0.5 percent. Then this exchanged faujasite is divided into two portions. One portion is calcined for six hours at 950° F. and the second portion is held as a wet cake.

Samples of the calcined portion and the wet cake are leached with water, a one percent hydrochloric acid solution or a 2 percent acetic acid solution. Then the treated calcined and wet cake samples are tested to obtain the X-ray powder diffraction patterns of each. As shown by the following data, the acid leached calcined samples show an X-ray "shift" or change in the ordered internal structure.

TABLE II
[Effect of acid leaching on rare earth exchanged faujasite (REX)]

| Catalyst | Leaching Solution | Percent Crystallinity | Percent Shift |
|---|---|---|---|
| REX Wet Cake | Water | 100 | 0 |
|  | 1% HCl | 85 | 0 |
|  | 2% acetic acid | 95 | 0 |
| Calcined REX [1] | Water | 100 | 0 |
|  | 1% HCl | 80 | 20 |
|  | 2% acetic acid | 85 | 20 |

[1] 10 hours at 950° F.

EXAMPLE II

Using the same general procedure outlined in Example I, sodium faujasite is ion exchanged with a rare earth chloride solution so as to produce a rare earth exchanged faujasite with 1.3% residual sodium. The exchanged faujasite is then washed with water, dried at 250° F. for three hours and calcined at 1100° F. for one hour in steam. The resulting activated catalyst is divided into two portions. One portion is set aside and the other is leached at 60° F. with a 1 N HCl solution. Samples of each portion are then evaluated by the microreactor test to determine their comparative activities α. Also X-ray powder diffraction patterns of the samples of the treated and untreated portions are obtained. As shown in the following data the X-ray shift indicates a reduction in the comparative activity α of the catalysts.

|  | Leached REX | Untreated REX |
|---|---|---|
| Percent Shift | 40 | 0 |
| α | 100 | 10,000 |

EXAMPLE III

Following the same procedure outlined for Example II, new catalysts are also prepared from hydrogen exchanged zeolite Y, and acid exchanged mordenite. The results of the X-ray powder diffraction patterns and the micro-method test for the acid treated and untreated samples of the catalysts are as follows:

EXAMPLE III

| Catalysts | Percent Shift | Activity α |
|---|---|---|
| H+ zeolite Y: |  |  |
| Acetic acid treated | 40 | 500 |
| Untreated | 0 | 6,000 |
| H+ mordenite: |  |  |
| HCl treated | 30 | 5,000 |
| Untreated | 0 | 10,000 |

EXAMPLE IV

In this example the catalyst prepared by leaching the rare earth exchanged faujasite described in Example II is used for the cracking of n-hexane. A stream of helium is bubbled through liquid n-hexane to vaporize the charge to provide an n-hexane charge stream. This charge is passed through a Vycor reactor containing catalyst at a temperature of about 800° F. and also at 900° F., at atmospheric pressure. The effluent product stream is analyzed by vapor phase chromatography. Results of the analysis are shown below in Table III.

*Table III*

| Temperature, ° F.: | n-Hexane Percent conversion |
|---|---|
| 800 | 75 |
| 900 | 100 |

EXAMPLE V

As outlined in Example IV, n-hexane is cracked in additional runs using the catalysts similar to those prepared in Example III. In addition one run is conducted using a rare earth exchanged faujasite catalyst with a comparative activity α of 10,000.

| Catalyst | Temp., ° F. | n-Hexane, Percent conversion |
|---|---|---|
| HCl treated H+ zeolite Y [a] | 750 | 95 |
| HCl treated H+ mordenite [a] | 650 | 75 |
| HCl treated REX [a] | 800 | 75 |
| Untreated REX | 600 | 85 |

[a] Treated with 1 N HCl.

EXAMPLE VI

Zeolite 13X was exchanged with 5% lanthanum chloride solution to produce a rare earth faujasite containing 1.3% sodium. The sample was divided and each part calcined as follows:

Sample A was calcined 1 hour at 400° F. in steam at atmospheric pressure.

Sample B was calcined 1 hour at 650° F. in steam at atmospheric pressure.

Sample C was calcined 1 hour at 1100° F. with steam at atmospheric pressure.

Ten grams each of Samples A, and C were stirred for 24 hours with 100 ml. of 1 normal HCl solution. They were then washed and calcined. The samples then had the following properties:

| Sample | A | B | C |
|---|---|---|---|
| RE₂O₃ content, wt. percent | 14.4 | 26.5 | 21.6 |
| Na content, wt. percent | 0.2 | | |
| Cyclohexane adsorption capacity [a] | 9.8 | 14.5 | 13.2 |
| X-ray crystallinity [b] | 20 | 175 | 120 |
| X-ray shift, percent | 50 | 0 | 40 |

[a] At room temperatures and 20 mm. parts of pressure.
[b] Relative peak heights on goniometer tracing from CuK$_\alpha$ radiation at Bragg angle 2θ of 33.5.

Catalysts were made from these samples by mixing 8 grams each of the aluminosilicates A, B and C with 72 grams of kaolin. These catalysts were pelleted and tested in the Cat D test. The activities and product selectively are shown below:

| Aluminosilicate in the catalyst composite | A | B | C |
|---|---|---|---|
| Conversions, vol. percent | 52.0 | 54.0 | 63.0 |
| Gasoline, vol. percent | 43.0 | 39.8 | 52.2 |
| Butanes and butenes | 11.6 | 12.4 | 11.8 |
| Dry gas (propane, propene, and lighter), wt. percent | 4.6 | 5.6 | 4.7 |
| Coke, wt. percent | 2.5 | 5.1 | 3.9 |
| Ratio Gasoline/Conversion | .82 | 0.74 | .83 |
| Ratio Gasoline/Coke | 17.2 | 7.8 | 13.3 |

Because these catalysts had different conversions their relative selectivities must be determined from the ratios shown at the bottom of the table. Thus the two catalysts A and C have the highest gasoline efficiencies, 0.82 and 0.83 respectively. Also it will be observed that these catalysts have the highest yield of gasoline per pound of coke, and also have the highest shift in the aluminosilicate component of the catalyst.

It will be appreciated that the examples set forth above as well as the foregoing specification are merely illustrative of the catalysts of the invention and the methods for preparing and using the same, and that various modifications and alterations may be made without departing from the spirit of the invention.

What is claimed is:

1. A method for preparing a hydrocarbon conversion catalyst which comprises treating an ion exchanged, activated crystalline aluminosilicate catalyst containing cations selected from the group consisting of rare earth metal cations, hydrogen and mixtures thereof introduced by ion exchange, and residual metal cations selected from the group consisting of alkali metals, alkaline earth metals and mixtures thereof, and having an ordered structure that exhibits an activity higher than desirable for an intended conversion, with a leaching acid solution having a concentration of from about 0.01 N to about 1 N to remove alumina from the ordered internal structure of the ion-exchanged, activated aluminosilicate without destroying its crystalline structure, and thereafter recovering a crystalline aluminosilicate conversion catalyst having a modified ordered internal structure that exhibits improved selectivity and lower activity suitable for the intended conversion.

2. The method of claim 1 in which the aluminosilicate has a silicon to aluminum ratio of at least 1.8 within an ordered internal structure.

3. The method of claim 1 in which the pore size of the aluminosilicate is at least about 4 A. in diameter.

4. The method of claim 1 in which the exchanged aluminosilicate catalyst has a residual content of from about 0.1 to about 5 percent by weight of the solid catalyst of the metal cations selected from the group consisting of alkali metals, alkaline earth metals, and mixtures thereof.

5. The method of claim 1 in which the exchanged aluminosilicate catalyst is a rare earth exchanged faujasite.

6. The method of claim 1 in which the exchanged aluminosilicate catalyst is hydrogen exchanged zeolite Y.

7. The method of claim 1 in which the exchanged aluminosilicate catalyst is hydrogen exchanged mordenite.

8. The method of claim 1 in which the conversion catalyst is contained in and distributed throughout a matrix binder material.

9. The method of claim 1 in which the leaching is effected at a temperature from about 0° F. to about 212° F.

10. The method of claim 1 in which said ion exchanged aluminosilicate catalyst is prepared by base exchanging an aluminosilicate material containing exchangeable metal cations selected from the group consisting of the alkali metals and alkaline earth metals in an ordered internal structure to partially replace the exchangeable metal cations with other ions, by washing, and by calcining the exchanged aluminosilicate to form a highly activated aluminosilicate having a residual content of the exchangeable metal cations therein and said conversion catalyst having a modified ordered internal structure with an activity less than the exchanged aluminosilicate, but greater than said aluminosilicate material before base exchange.

11. The method of claim 1 in which recovery of said conversion catalyst includes washing the treated aluminosilicate and thereafter thermally treating it at elevated temperatures.

12. A catalyst for the conversion of hydrocarbons which comprises an ion-exchanged, activated crystalline aluminosilicate containing cations selected from the group consisting of rare earth metal cations, hydrogen, and mixtures thereof introduced by said ion-exchange and residual metal cations selected from the group consisting of alkali metals, alkaline earth metals, and mixtures thereof, and having an ordered internal structure which exhibits an activity much higher than desired for an intended conversion, which has been treated with a leaching acid solution having a concentration of from about 0.01 N to about 1 N to remove alumina from the ordered internal structure of the ion-exchanged, activated aluminosilicate without destroying its crystalline structure, whereby said catalyst has a modified ordered internal structure with an activity suitable for the intended conversions.

13. The catalyst of claim 12 in which the modified ordered internal structure has an X-ray shift as compared to the diffraction pattern of the ordered internal structure of the more active aluminosilicate catalyst.

14. The catalyst of claim 12 in which said modified ordered internal structure contains cations of the rare earth metals.

References Cited

UNITED STATES PATENTS

| 2,971,904 | 2/1961 | Gladrow et al. | 208—135 |
| 3,130,006 | 4/1964 | Rabo et al. | 23—110 |
| 3,236,762 | 2/1966 | Rabo et al. | 208—111 |

ABRAHAM RIMENS, *Primary Examiner.*

DELBERT E. GANTZ, *Examiner.*